United States Patent

Risen, Jr. et al.

[11] Patent Number: 6,143,108
[45] Date of Patent: Nov. 7, 2000

[54] METHODS AND COMPOSITIONS FOR JOINING WAVEGUIDE STRUCTURES AND THE RESULTING JOINED PRODUCTS

[76] Inventors: William M. Risen, Jr., 87 Miller Ave., Rumford, R.I. 02916; Yong Zhong Wang, 30 E. Transit St., #3, Providence, R.I. 02912

[21] Appl. No.: 09/091,495
[22] PCT Filed: Dec. 18, 1996
[86] PCT No.: PCT/US96/20265
§ 371 Date: Sep. 18, 1998
§ 102(e) Date: Sep. 18, 1998
[87] PCT Pub. No.: WO97/24635
PCT Pub. Date: Jul. 10, 1997
[51] Int. Cl.[7] .................................................. B32B 31/26
[52] U.S. Cl. .................................. 156/89.11; 385/134
[58] Field of Search .......................... 156/89.11; 264/624; 385/134; 428/428; 501/53, 54, 133

[56] References Cited

U.S. PATENT DOCUMENTS

| 5,235,658 | 8/1993 | Dragone et al. |
| 5,399,233 | 3/1995 | Marazumi et al. |
| 5,407,504 | 4/1995 | Ewart-Paine |
| 5,516,388 | 5/1996 | Moran et al. |
| 5,616,202 | 4/1997 | Camilletti et al. |

FOREIGN PATENT DOCUMENTS

| 97/22653 | 6/1997 | WIPO |
| 97/24223 | 7/1997 | WIPO |

*Primary Examiner*—Curtis Mayes
*Attorney, Agent, or Firm*—Fay, Sharpe, Fagan, Minnich & McKee, LLP

[57] ABSTRACT

This invention concerns the joinder of optical waveguide structures and their substrates, methods for joining, attaching or connecting the waveguide structures, and/or materials which can be utilized for constructing such attachments or connections. The invention is also directed to the attachment of alternative silicon and germanium based optical components, methods for making the attachment, and materials utilized to produce the attachment.

13 Claims, 2 Drawing Sheets

Schematic of fixation of quartz to quartz by a thin silica film $SiO_2/Si$ and $SiO_2/SiO_2$ Adhesion: Fiber Attachment Schematic of fixation of quartz to quartz by a thin silica film ably employed in other environments
METHODS AND COMPOSITIONS FOR JOINING WAVEGUIDE STRUCTURES AND THE RESULTING JOINED PRODUCTS This invention was made with government support under Contract No. F-49620-93-1-0049 from the U.S. Air Force Office of Scientific Research. Consequently, the Government may have certain rights in this invention.

FIELD OF THE INVENTION

This invention pertains to the art of optical devices. The invention is particularly applicable to the attachment of a silicon based optical component to a substrate and will be described with particular reference thereto. However, it will be appreciated that the invention has broader applications and may be advantageously employed in other environments and applications.

BACKGROUND OF THE INVENTION

An optical waveguide structure is a device which constrains or guides the propagation of light waves along a path defined by the physical construction of the waveguide. It is important to be able to join optical waveguides together or to substrates or other supportive devices.

The waveguides, substrates and supportive devices are constructed of materials comprising silicon or germanium or their oxides and oxide based glasses and crystals. Examples of silicon or germanium based objects which may be joined together include, but are not limited to, silica-based optical fibers, silicon-based V-groove supports for attaching fibers to a planar waveguide structure, oxide surface layers comprising silicon or germanium, and optical devices comprising inorganic oxides. In some cases it is useful to have an attachment or coupling that is chemically stable at temperatures above about 300° C. with some applications requiring an upper stability temperature of above 1000° C. in order to permit further processing of the joined devices.

It is known that the joinder of silica-based optical fibers to substrates and to one another can be achieved in several ways. These can include melting, use of epoxy resins or other organic materials as the layers, use of mechanical devices, and the use of silica particle dispersions. While each of these can serve a purpose, they have certain deficiencies. For example, melting can be expensive, and it can cause deformation and loss of optical signal. Organic resin layers are thermally and chemically unstable at high temperatures and under other conditions at which some processing or operating of the attached pieces is to be accomplished. The use of mechanical attachments devices typically involves clamps or similar fixtures, together with additional lens systems, and may be suitable only to a small range of applications and/or materials. The use of silica particle dispersions as precursors to silica for adhesion is known, but the composition range (both of the layer and of the materials attached) is limited.

Furthermore, it is important also to be able to make connections between fibers and substrates with a very high degree of repeatability so that many connections can be made, without fault, on the same substrate. Otherwise, it may be impractical to make a device that requires many connections. Another issue is that it is desirous to make the connections fairly quickly and efficiently.

Accordingly, it is the object of the invention to provide silicone materials which can be processed into silica, germanosilicate or other glassy materials to attach, join or couple glassy objects to substrates such as silicon, germanium, silica, or silicates. The present invention allows for the quick connection of optical waveguide structures.

A futher object of the invention is to provide methods for forming silica, silicate binding layers from the silicone materials. An additional object of the invention is to produce joined optical components.

These and other objects and features of the invention will be apparent from the following summary and description of the invention and from the claims.

BRIEF DESCRIPTION OF THE DRAWINGS

The following is a brief description of the figures which are presented for the purpose of illustrating the invention and not for the purpose of limiting the same.

SUMMARY OF THE INVENTION

Figure 1:
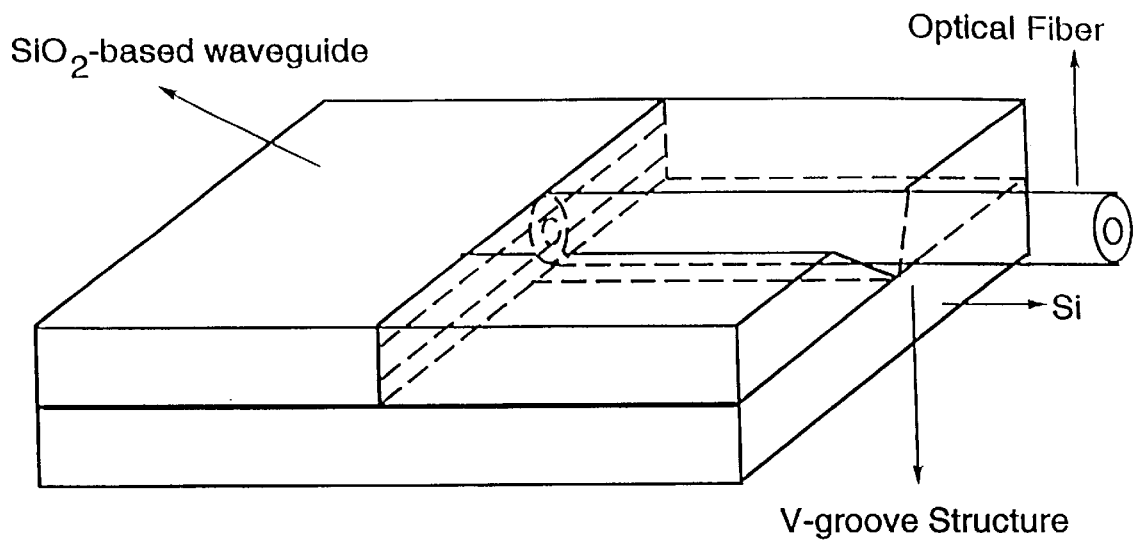
FIG. 1 illustrates the binding of an optical fiber and a V-groove structure utilizing HmPSI (m/(n+m)=0.14–1.0).
Figure 1:
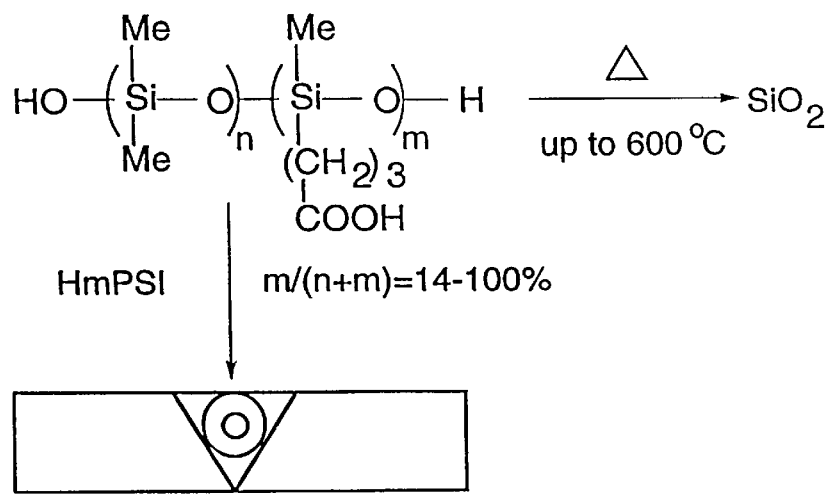

In accomplishing the foregoing and related objectives, the invention provides compositions of carboxylated silicone precursors, such as carboxylated polysiloxanes and carboxylated polygermanosiloxanes, and glassy and crystalline compositions to bind, couple or connect waveguide structures to one another and/or substrate surfaces. The invention further provides methods for forming silica and germanosilicate binding layers from these precursor materials.

Additionally, the invention relates to methods of binding one or more objects such as optical fibers and V-grooves to one another or to other substrates. Further, the invention relates to silicon, silica, silicon based oxide glass or crystal, germanium, or to amorphous or crystalline germanium containing oxides or related silicon or germanium compounds such as pnictides, or chalcogenides utilized in the invention. Moreover, the invention is directed to the products produced by the methods and compositions of the invention.

In accordance with a more limited aspect of the invention, a method for attaching a silicon based component to a substrate is provided. The method entails the preparation of a carboxylated silicone precursor composition, the application of the carboxylated silicone composition to an interface surface between a silicon based optical component and a substrate to form an interface film and the thermal oxidation of the precursor film thereby joining the optical component to the substrate.

The carboxylated silicone precursors, such as carboxylated polysiloxanes and carboxylated polygermanosiloxanes, are soluble in organic solvents. They form thin coating layers around objects applied to or thin coating layers in the interface of two objects after the organic solvents evaporate. The carboxylated silicone layer between two objects can bind the objects together and it can form oxide interfacial binding layers upon thermal oxidation. Thus, upon heating in air or oxygen, the silicone or germanosilicone layer decomposes to form a silica or germanosilicate composition between the two objects thereby binding them together.

Besides the thermal oxidation of the silicone materials using conventional heating, other means of providing energy, such as laser heating, or other oxidation methods, such as plasma oxidation, also can be used to achieve the transformation of the silicone materials into silica or germanosilicate binding layers.

DETAILED DESCRIPTION OF THE INVENTION

The present invention is directed to achieving adhesion between optical devices such as waveguide components. In one aspect, the present invention is directed to a method for making glassy and crystalline layers from carboxylated silicone precursors, such as carboxylated polysiloxanes and carboxylated polygermanosiloxanes. This is discussed in detail below.

A. Preparations of Carboxylated Siloxane Precursor Compositions

1. Preparation of poly(carboxypropylmethyl)siloxane (H100PSI)

A sample of 20 mL of 3-cyanopropylmethyldichlorosilane was placed in a round bottom flask and stirred while 4.2 mL of water was added dropwise. The mixture was stirred at room temperature for 4 hours and then heated in a water bath at about 70° C. for 20 hours to form cyano-containing polysiloxane. Then 20 mL of 8M HCl was added to the flask to hydrolyze the cyano groups into carboxylic acid groups. The hydrolysis was carried out at 70° C. for about 24 hours. Next, 50 mL of water was added to the flask to dissolve HCl and $NH_4Cl$ trapped inside of the carboxylated polysiloxane. The water was allowed to stay on the top of the viscous product for 6 hours. The water with HCl and $NH_4Cl$ was decanted, and 50 mL of water was added to the flask again. This step was repeated several times until the pH value of the decanted water was about 7. Then, 100 mL of acetone was added to the flask to dissolve the product. The acetone phase was separated from $NH_4Cl$ on the bottom of the flask, and then dried with anhydrous $Na_2SO_4$ overnight. Acetone was then evaporated at reduced pressure. The resultant product (H100PSI) was very viscous. The structure of H100PSI is shown in Formula 1 below.

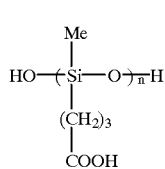

Formula 1

2. Preparation of a Carboxylated Polysiloxane Copolymer, HmPSI, with 14 mol % Carboxylated Groups, H14PSI.

First, 10 mL of dichlorodimethylsilane (Aldrich Company) and 2.13 mL of 3-cyanopropylmethyldichlorosilane (United Chemical Technologies, Inc.) were added to a flask and mixed under dry $N_2$ flow for 5 minutes. 2.2 mL of water was then added drop by drop to the flask to hydrolyze the silane mixture. Gaseous HCl evolved immediately after the addition of water. The mixture was stirred at room temperature for 4 hours and at 70° C. for another 20 hours. At this stage, the Si—Cl bonds of the silanes were effectively hydrolyzed and hydrolyzed moieties had condensed to form viscous cyano-containing siloxane copolymer. About 20 mL of 8M HCl was added to the flask to hydrolyze the cyano groups into carboxylic acid groups. The hydrolysis of cyano groups was carried out at 70° C. for 24 hours. Diethyl ether was added to the flask to extract the product. The ether solution of the product was washed with water to remove any HCl and $NH_4Cl$ trapped in the product. The solution was then dried with anhydrous $Na_2SO_4$. The evaporation of the ether at reduced pressure (Rotavapor) left a viscous carboxylated siloxane copolymer in the flask. The composition of 14 mol % carboxyl-containing polysiloxane, H14PSI, is represented by the following general formula (Formula 2).

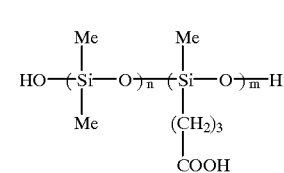

Formula 2 where n and m are the mole fractions such that n+m=1, n=0.86 and m=0.14 for H14PSI.

3. Preparation of a Carboxylated Polysiloxane Copolymer with 50 mol % Carboxylated Groups, H50PSI.

First, 10 mL of dichlorodimethylsilane (Aldrich Company) and 13.11 mL of 3-cyanopropylmethyldichlorosilane (United Chemical Technologies, Inc.) were added to a flask and mixed under dry $N_2$ flow for 5 minutes. 2.2 mL of water was then added drop by drop to the flask to hydrolyze the silane mixture. Gaseous HCl evolved immediately after the addition of water. The mixture was stirred at room temperature for 4 hours and at 70° C. for another 20 hours. At this stage, the Si—Cl bonds of the silanes were effectively hydrolyzed and hydrolyzed moieties had condensed to form viscous cyano-containing siloxane copolymer. About 20 mL of 8M HCl was added to the flask to hydrolyze the cyano groups into carboxylic acid groups. The hydrolysis of cyano groups was carried out at 70° C. for 24 hours. Diethyl ether was added to the flask to extract the product. The ether solution of the product was washed with water to remove any HCl and $NH_4Cl$ trapped in the product. The solution was then dried with anhydrous $Na_2SO_4$. The evaporation of the ether at reduced pressure (Rotavapor) left a viscous carboxylated siloxane copolymer in the flask. The composition of this 50 mol % carboxyl-containing polysiloxane, H50PSI, is represented the following general formula:

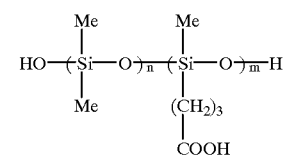

Formula 2 where n and m are the mole fractions such that n+m=1, n=0.50 and m=0.50 for H50PSI.

4. Preparation of Carboxylated Polygermanosiloxanes, CPGS

The carboxyl-containing polygermanosiloxanes or CPGSs used as precursors in the invention have the general Formula 3 (see below) in which $R_1$–$R_5$ are alkyl groups such as methyl groups, $R_6$ is an alkyl radical such as $(CH_2)_3$ and n, m, and k are mole fractions such that n+m+k=1 with k/(n+m+k) ranging from 0.1 to 0.60.

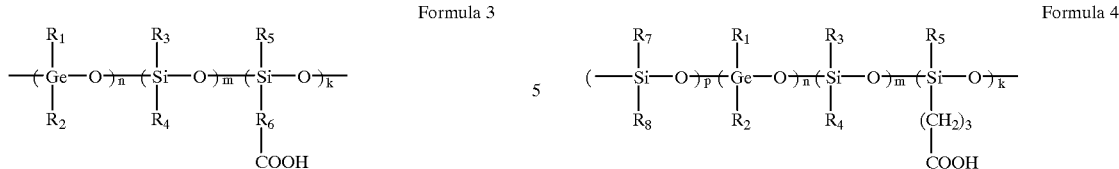

Formula 3

Formula 4

The carboxylated polygermanosiloxane, CPGS, involving methyl groups was synthesized as follows. First, a carboxylated siloxane, H100PSI, was synthesized as discussed in Preparation 1. A sample of the H100PSI (0.4657 g) was mixed with 20.0 mL $H_2O$ and 0.3966 g NaOH and kept in a capped glass bottle for 3 days at 70° C. The resultant solution was placed in a 125 mL flask at 25° C. and 80 mL of diethyl ether was added. Then 0.26 mL of dichlorodimethyl germane and, 2.1 mL of dichlorodimethylsilane were added to this mixture. The two phases were stirred for 3 hours at 25° C. with a reflux condenser in place. Then the ether phase was separated and dried with anhydrous sodium sulfate. Then the ether was evaporated from the ether solution at reduced pressure to yield a viscous fluid product. It was shown by infrared spectroscopy to contain silicon-oxygen-germanium (970 $cm^{-1}$) and silicon-oxygen-silicon (1000–1100 $cm^{-1}$) bonds, and carboxylate groups in the acid form (1712 $cm^{-1}$). From proton nuclear magnetic resonance (H-NMR) spectroscopy, the dimethyl germanium containing groups comprised 7.7 mol %, the dimethyl silicon containing groups comprised 68.8 mol %, and the methyl carboxypropyl silicon containing groups comprised 23.5 mol %. Thus, the composition of this CPGS is represented stoichiometrically, but not necessarily in terms of monomer sequence, by Formula 3, wherein all R groups are methyl and where n, m, k are the mole fractions such that n+m+k=1, and n=0.077, m=0.688 and k=0.235.

5. Preparation of Vinyl Containing Carboxylated Polygermanosiloxane, CVPGS.

A carboxylated polygermanosiloxane polymer containing vinyl groups was prepared as follows. First, 0.7343 g H100PSI, 0.6804 g NaOH and 10 mL of water were mixed together and kept in a capped bottle for 16 hours. The resultant solution was placed in a 125 mL flask. In another bottle, 0.83 mL of dimethyldichlorogermane, 0.47 mL of methylvinyldichlorosilane, and 1.58 mL of dimethyldichlorosilane were mixed together with 60 mL of diethyl ether. Then, the mixture also was added to the flask. The two phases were stirred for 4 hours at 25° C. The diethyl ether phase was separated and dried with anhydrous sodium sulfate. Then, the ether was evaporated from the ether solution at reduced pressure to yield a carboxyl and vinyl containing polygermanosiloxane in which about 14 mol % of the groups contained carboxylic acid containing substituents, 10 mol % had vinyl containing substituents, and about 20 mol % of the groups contained germanium. The general Formula 4 applies to this material, with $R_1$ through $R_6$ being methyl groups and $R_7$ being vinyl in this case. Generally, the groups are alkyl and/or alkene, and the in-chain units can be randomly arranged along the chain.

6. Preparation of Carboxyl-Containing Germanium Sesquioxide Siloxane Copolymer, or CGSS Carboxyl-containing germanium sesquioxide copolymers used as precursors in the invention have the following general Formula 5 (below) in which $R_1$ and $R_2$ can be alkyl groups, such as methyl groups, or alkene groups, such as vinyl groups, and $R_3$ is an alkyl or substituted fragment, such as $CH_2CH_2$, and n, a, b, c are mole fractions such that n+a+b+c=1 with n/(n+a+b+c) ranging from 0.01 to 0.33.

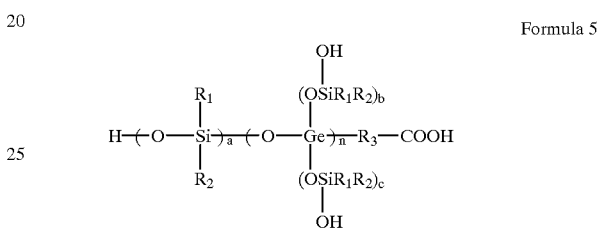

Formula 5

The preparation of a germanium sesquioxide siloxane copolymer (CGSS) was carried out as follows. In this preparation, 1.0065 g of carboxyethyl germanium sesquioxide (obtained from Gelest Inc, Tullytown Pa., Cat No GE C2100) was combined with 20.0 mL of water and 0.95 g of sodium hydroxide and allowed to react for 12 hours at 70° C. in a capped glass bottle. Then this product was cooled to 25° C. and placed in a 250 mL single neck round bottom flask with 50 mL of diethylether and 6.5 mL of dichlorodimethylsilane (Aldrich Chemical Co., Cat No. D6,082-6) and a reflux condenser was placed in the neck. This mixture was stirred for 3 hours at 25° C. Then the ether phase containing the product was dried with anhydrous sodium sulfate. This drying solid was separated from the ether phase. The ether was removed from the ether phase under reduced pressure. The resultant viscous product is believed to be represented by the general Formula 5.

The existence of the germanium-oxygen-silicon (970 $cm^{-1}$) silicon-oxygen-silicoll (1000–1100 $cm^{-1}$) and carboxylate groups (1712 $cm^{-1}$) as well as the features expected from the formula, such as $CH_3$ on Si at 1260 $cm^{-1}$, was shown by infrared spectroscopy. The H-NMR spectrum of the product was obtained and interpreted to show that n/(a+b+c) is 7.5/92.5 or 0.081 for this example.

7. Preparation of a Carboxyl and Vinyl Containing Germanium Sesquioxide Polygermanosiloxane (CVGSS) Copolymer A CVGSS material was obtained by by first combining 1.5067 g carboxyethyl germanium sesquioxide, 1.4217 g of NaOH and 20 mL of water in a glass bottle. The bottle then was capped and put into an oven at 70° C. for 16 hours. The solution in the bottle was transferred to a 125 mL round bottom flask, and then 50 mL of diethyl ether was added to the top of the solution in the flask. It was a two phase system. Then, 1.55 mL of methylvinyldichlorosilane and 4.67 mL of dimethyldichlorosilane were added slowly to the diethyl ether phase in the flask. The water phase was stirred gently so that the two silanes in the diethyl ether phase could react at the interface with the germanium sesquioxide reaction product in the water phase to form the carboxyl and vinyl containing polygermanosiloxane. The product in the diethyl ether phase was transferred to another flask and the solution was dried with anhydrous sodium sulfate. The polygermanosiloxane in which about 15 mol % of the units contained carboxyl groups and 20 mol % contained vinyl groups was achieved after the solvent was removed under vacuum. The CVGSS polymers can be represented by general Formula 6, in which, for this example, $R_1$ and $R_2$ are methyl, $R_3$ is $C_2H_4$, and $R_4$ is vinyl ($CHCH_2$), and $n/(n+a+b+c+d+e+f)$ is 0.15, $(d+e+f)/(n+a+b+c+d+e+f)$ is 0.2 and $(a+b+c)/(n+a+b+c+d+e+f)$ is 0.65.

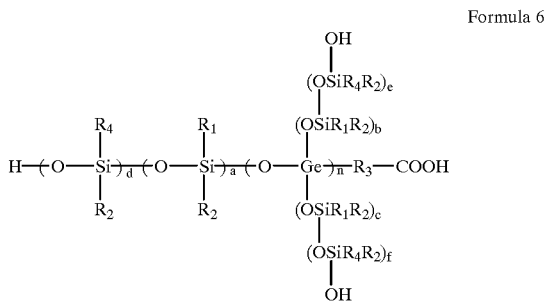

Formula 6

8. Preparation of a Carboxyl and Vinyl Containing Polygermanosiloxane (CVGSS) Copolymer Another CVGSS material represented by the general Formula 6 was obtained by first combining 1.4967 g carboxyethyl germanium sesquioxide, 1.42 g of NaOH and 20 mL of water in a glass bottle. The bottle then was capped and put into an oven at 70° C. for 16 hours. The solution in the bottle was transferred to a 125 mL round bottom flask, and then 50 mL of diethyl ether was added to the top of the solution in the flask. It was a two phase system. Then, 2.30 mL of methylvinyldichlorosilane and 3.90 mL of dimethyldichlorosilane were added slowly to the diethyl ether phase in the flask. The water phase was stirred gently so that the two silanes in the diethyl ether phase could react at the interface with the germanium sesquioxide reaction product in the water phase to form the carboxyl and vinyl containing polygermanosiloxane. The product in the diethyl ether phase was transferred to another flask and the solution was dried with anhydrous sodium sulfate. The polygermanosiloxane in which about 15 mol % of the units contained carboxyl groups and 30 mol % contained vinyl groups was achieved after the solvent was removed under vacuum.

9. Preparation of a Germanium Ester of a Carboxylated Polysiloxane, or GEPSI

The germanium esters of carboxylated polysiloxane used as precursors in the invention have the following general Formula 7 in which $R_1$–$R_5$ are alkyl or alkene groups, such as methyl groups, and $R_6$ is an alkyl or substituted alkyl fragment, such as $CH_2CH_2$, X is H or C (from another carboxylate group), and n, m and k are mole fractions such that n+m+k=1 with m/(m+k) ranging from 0.10 to 0.8 and n/(n+m+k) ranging from 0.10 to 0.90

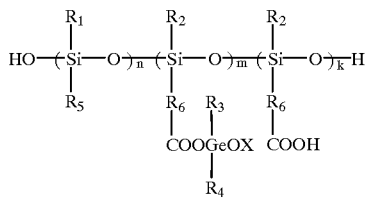

Formula 7

The preparation of an approximately 20 mol % germanium ester of H100PSI, was carried out as follows. First, 0.4525 g of H100PSI was dissolved in 10.0 mL of ethanol. Also, 0.0759 g of tetrameric dimethylgermanium oxide (which was synthesized from dichlorodimethylgermane (Gelest, Inc) according to method described by Rochow (M. P. Brown and E. G. Rochow, J. Am. Chem. Soc., 82, 4166(1960)) was dissolved in 1.0 mL of water at room temperature for 4 hours. The two solutions were mixed in a 20 mL bottle. The mixture in the uncapped bottle was then held in a drying oven at 70° C. for 12 hours to evaporate the ethanol and water. The product in the bottle then was dried in a vacuum oven at 60° C. for 4 hours. The product can be shown in one representation as given by Formula 7, where all R groups are methyl and X can be H, Ge, Si or C. It appears that X initially and for sometime (about 1 week or more, depending on temperature and other conditions) is H primarily. However, since the viscosity of the product increases gradually with time, it appears that condensation occurs between these OH groups and other carboxylates or Si—OH end groups to form larger molecules. Thus, a range of viscosities and products can be obtained by controlled aging of the initial product.

The infrared spectrum of the initial product shows the germanium ester form (1688 cm$^{-1}$) in addition to the expected features of H100PSI. The germanium to silicon mole ratio overall is 0.21, or about 0.2 or 2 to 10. Thus, about 20% of the Si units in H100PSI have been formed into germanium ester form.

10. Preparation of a Germanium Ester of a Carboxylated Polysiloxane, or GEPSI

The preparation of another germanium ester of H100PSI, also corresponding to formula 7, was carried out by the method given in preparation 9 (above) but with the following amounts of reactants. First, 0.1291 g of tetrameric germanium oxide was dissolved in 1 mL of water. Then, 0.2384 g of H100PSI was dissolved in 10 mL of ethanol. The two solutions were mixed together and the product was dried in an oven at 70° C. overnight. The germanium to silicon mole ratio is about 6.7 to 10. About 67% of the Si containing units in H100PSI have been formed into germanium ester form.

B. The Joinder of Optical Waveguide Structures or Other Optical Components Utilizing the Carboxylated Siloxane Precursor Compositions The carboxylated siloxane (silicone) precursor compositions described in the foregoing paragraphs are applied to form the initial junction or interface joining two silicon dioxide ($SiO_2$) based optical components, such as the coupling of two waveguide structures. The precursor compositions can be heated to produce glassy or glass-crystalline materials to form the interface and adhesive between the components.

In this regard, the carboxylated silicone composition is first dissolved to form a dilute solution in an organic solvent such as ethanol, acetone, ethyl ether. The dilute solution is then added to the interface of two objects using a micropipet. A thin silicone film between the two object forms after the solvent is evaporated. The two objects temporarily physically held together, with the aid of a device or simply the use of gravity, and with the silicone or germanosilicone at the interface then are thermally oxidized such as by heating in an oven up to 600° C. for the transformation to a silica or germanosilicate binding layer. The heating also can be accomplished in air using a laser or other focused sources of radiation.

The joinder or coupling of optical structures utilizing various carboxylated silicone (siloxane containing) precursors are more particularly described below. However, the following examples are illustrative only and are not to be construed as limiting the invention which is described above and properly delineated in die claims.

EXAMPLE 1

Attachment of Optical Fibers to Si V-groove Structure by a Germanium Silicate Formed From CPGS (Formula 3)

A sample of the CPGS copolymer with 16.4 mol % germanium and 21.3 mol % carboxyl, prepared as described above, was dissolved in diethyl ether at a concentration of $3 \times 10^{-2}$ g/mL. A small amount of the solution, about $2 \times 10^{-5}$ mL, was drawn into a thin glass capillary tube (OD=1.15 mm and ID=0.25 mm) by capillary action. A part of this solution was added to the space at the junction of a silicon V-groove and a silica optical fiber by touching the liquid at the end of the tube to this region of the fiber. See FIG. 1. The amount added is estimated to be about $1 \times 10^{-6}$ mL.

The silicon V-groove used consisted of a piece of silicon wafer, about 0.5 mm thick and 2.47 mm wide with a V-shaped groove cut into it so that an optical fiber could rest in the groove. A short piece of fiber (about 2.5 cm) was placed with one end in one V-groove (see FIG. 1) and the other end in a second V-groove facing the first one (Not illustrated in FIG. 1). The two V-groove bases were supported by a flat silicon wafer. The application of the CPGS solution to this structure was done to the V-groove fiber junction, as described above, and also to the region near the junction of the V-groove-containing silicon pieces and the silicon wafer substrate. The silicon components, the wafer and the V-groove structures, were handled in air and thus had some oxide on the surface initially.

This structure was placed in a tube furnace and heated in the air according to the following schedule: (a) 25° C. to 200° C. over 5 min, (b) at 200° C. for 30 min, (c) to 250° C. over 1.5 min and at 250° C. for 45 min, (d) to 500° C. over 6 min and at 500° C. for 75 min, (e) to 550° C. over 2 m and at 550° C. for 30 min, and (f) to 600° C. over 2 min and at 600° C. for 60 min. The furnace then was turned off and was allowed to cool to about 70° C. Then the sample structure was removed.

The fiber was well adhered to the V-groove according to several criteria. First, when the structure was inverted, the fiber did not fall out of the V-grooves. Second, when the structure was inverted and then tapped with a pencil on the opposite surface of the substrate, the fiber did not disengage from the V-groove and the V-groove structures did not disengage from the silicon wafer substrate. Third, a sharp (razor) blade was used to cut the fiber near one V-groove support and to pry off that support. Following those actions, the remaining section of the fiber protruded from the first V-groove support and remained attached to it in the horizontal position parallel to the surface of the silicon wafer base. Examination of the remaining structure under 10× magnification indicated that the CPGS polymer had reacted to form a monolithic attachment structure at the fiber—V-groove junction region and, before forced detachment, in the part of the silicon wafer—silicon V-groove interface. This is where the polymer solution had transferred when it initially was applied to the region near the pieces.

EXAMPLE 2

Attachment of Optical Fibers to a Si V-groove by Silica Formed From H100PSI

The procedure of Example 1 was repeated to adhere a silica-based optical fiber to a silicon V-groove assembly with the exception that the carboxylated siloxane H100PSI was used as the initial material and glass interface precursor. The H100PSI was dissolved in ethanol with a concentration of $4 \times 10^{-2}$ g/mL. Attachment was achieved similarity between the fiber and the silicon V-groove and between the silicon V-groove and the silicon wafer substrate. The silicon components, having been exposed to air, possessed some native oxide on the surface initially.

EXAMPLE 3

Attachment of Optical Fibers to Si V-grooves By Silica Formed From H14PSI

The procedure of Example 1 was further repeated to adhere a silica based optical fiber to a silicon V-groove assembly with the exception that the carboxylated siloxane H14PSI was used as the precursor and the heating sequence differed. This structure was placed in a tube furnace and heated in the air according to the following schedule: (a) 25° C. to 400° C. over 10 min, (b) at 400° C. for 60 min, (c) to 600° C. over 5 min and at 600° C. for 60 min. Then the furnace was turned off and was allowed to cool to about 70° C. Then the sample structure was removed from the furnace. The fiber was well adhered to the V-groove.

EXAMPLE 4

Attachment of a Fiber to Another Fiber By Silica Formed From H100PSI

In an assembly of two facing silicon V-groove and a silicon wafer substrate, two fibers were laid parallel and touching one another into the same V-grooves. A sample of H100PSI polymer, as used in Example 2, then was applied by allowing a droplet of solution to wet the interface between the fibers. The assembly was heated according to the program of Example 1. Upon cooling, the two fibers were attached by silica formed from the pyrolysis of H100PSI.

EXAMPLE 5

Attachment of Metal to Si By Silica Formed Form H14PSI

A piece of silicon wafer (V-groove component) coated with metal layer (copper) was placed on a silicon wafer. The metal coated side of the V-groove component was in contact with the surface of the silicon wafer. A sample of the H 14PSI copolymer prepared as described above was dissolved in diethyl ether at a concentration of $3 \times 10^{-2}$ g/mL. A small amount of the solution, about $2 \times 10^{-5}$ mL, was drawn into a thin glass capillary tube (OD=1. 15 mm and ID=0.25 mm)

by capillary action. Then a part of this amount of solution was added to the space at the junction of a silicon V-groove and a silicon wafer by touching the liquid at the corner of tile Si—V-groove on the silicon wafer. The amount added is estimated to be about $1\times10^{-6}$ mL.

The structure was placed in a tube furnace and heated according to the procedure described in Example 3. The V-groove component with a metal coating was attached to the silicon wafer by silica-like material formed from the pyrolysis of H14PSI.

EXAMPLE 6

Attachment of Quartz to Quartz By Silica Formed From H100PSI

Figure 2:
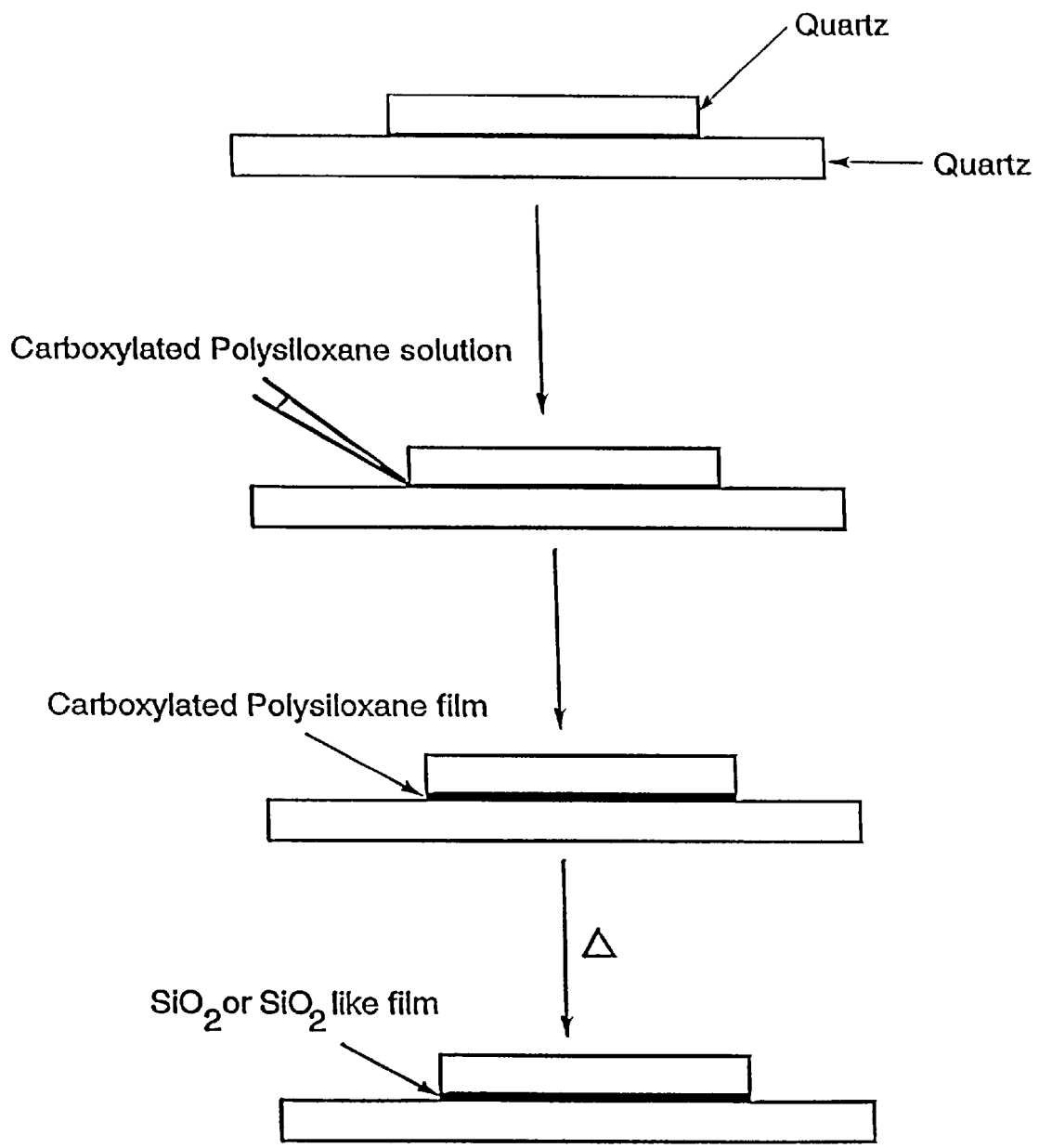
FIG. 2 shows the fixation of two quartz wafers by a thin silica film.

Two pieces of quartz were cleaned with acetone and ethanol. One was placed on the top of another. See FIG. 2. The ethanol solution of H100PSI used in Example 2 was added to the interface of the two quartz by the method described in Example 1. The structure was placed in the tube furnace and heated in air according to following procedure: (a) 25° C. to 200° C. over 2 min, (b) at 200° C. for 40 min, (c) to 250° C. over 1.5 min and at 250° for 30 min, (d) to 500° C. over 6 min and at 500° C. for 180 min, (e) to 550° C. over 2 min and at 550° C. for 30 min, and (f) to 600° C. over 2 min and at 600° C. for 100 min. Then the furnace was turned off and was allowed to cool to about 700 C. Then the sample structure was removed from the furnace. The two pieces of quartz were attached together.

EXAMPLE 7

Attachment of Silicon to Silicon By Silica Formed From H14PSI

Two silicon wafers (Si(111)) were cleaned with ethanol and one was placed on top of another. The diethyl ether solution of H14PSI with a concentration of $3\times10^{-2}$ g/mL was added to the interface of the two silicon wafers by the method described in Example 1. The structure was placed in a tube furnace and heated in air according to the following procedure: (a) 25° C. to 400° C over 10 min, (b) at 400° C. for 80 min, (c) to 600° C. over 5 min and at 600° C. for 60 min. Then the furnace was turned off and was allowed to cool to about 70° C. Then the sample structure was removed from the furnace. The two pieces of silicon wafers were well attached together.

EXAMPLE 8

Attachment of Silicon to Quartz by Silica Formed From H14PSI

A silicon wafer was placed on top of a quartz window. The diethyl ether solution of H14PSI with a concentration of $3\times10^{-2}$ g/mL was added to the interface of the two silicon wafers by the method described in Example 1. The structure was placed in a tube furnace and heated in air according to the following procedure: (a) 25° C. to 400° C. over 10 min, (b) at 400° C. for 80 min, (c) to 600° C. over 5 min and at 600° C. for 60 min. Then the furnace was turned off and allowed to cool to about 70° C. Then the sample structure was removed from the furnace. The silicon wafer was attached to the quartz substrate.

The invention has been described with reference to the preferred embodiement. Obviously, modifications and alterations will occur to others upon a reading and understanding of the preceding detailed description. It is intended that the invention be construed as including all such alterations and modifications insofar as they come within the scope of the appended claims or the equivalent thereof.

Having thus described the invention, it is claimed:

1. A method for attaching a silicon based optical component to a substrate comprising the steps of:
   a) preparing a carboxylated silicone precursor composition;
   b) applying the carboxylated silicone precursor composition to an interface surface between a silicon based optical component and a substrate to form an interface precursor film; and,
   c) thermally oxidizing the precursor film thereby attaching the optical component to the substrate.

2. The method of claim 1, wherein said carboxylated silicone precursor composition is selected from the group consisting of carboxylated polysiloxane, carboxylated polygermanosiloxane, carboxylated germanium sesquioxide siloxane copolymers, and germanium esters of carboxylated polysiloxane.

3. The method of claim 2, wherein said carboxylated polysiloxane is selected from the group consisting of poly (carboxypropylmethyl) siloxane (Formula 1);

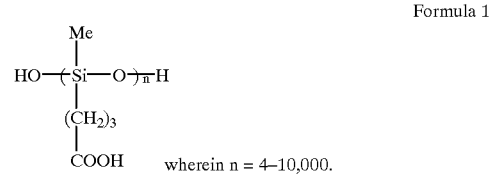

Formula 1 wherein n = 4–10,000.

4. The method of claim 2, wherein said carboxylated polygermanosiloxane is selected from the group consisting of vinyl containing carboxylated polygermanosiloxane (Formula 4),

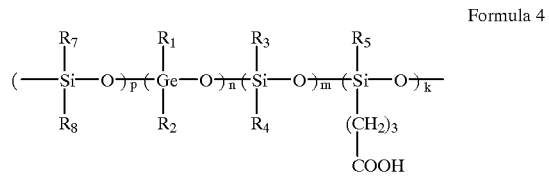

Formula 4 wherein, $R_1$–$R_5$ are alkyl or alkenyl) groups, $R_6$ is a vinyl group, $n/(n+k+p+m)$ is 0.001 to 0.5, and $k/(n+m+k+p)$ is 0.001 to 0.99.

5. The method of claim 2, wherein said carboxylated polysiloxane is HmPSI with $m/(n+m)$ ranging from 0.1 to 0.99, and n ranging from 4 to 10,000 where HmPSI is represented by Formula 2:

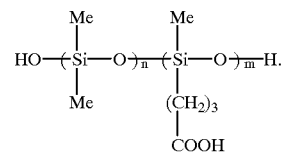

6. The method of claim 5, wherein said carboxylated polysiloxane is H50PSI.

7. The method of claim 5, wherein said carboxylated polysiloxane is H14PSI.

8. The method of claim 2, wherein said germanium esters of carboxylated polysiloxane are germanium esters of HMPSI with m ranging from 14 to 99.9 mol %.

9. The method of claim 1, wherein said substrate is selected from the group consisting of silicon, silica, silicon oxide glasses, silica coated silicon, metal silicate coated silicon and germanium.

10. The method of claim 9, wherein said silicon substrate is a silicon wafer.

11. The method of claim 1, wherein said thermal oxidization occurs according to a time-temperature program comprising the steps of:

a) heating from 25° C. to 200° C. in 2 to 10 min.;

b) heating at 200° C. for 30–40 min.;

c) heating from 200° C. to 250° C. in about 1.5 min. and at 250° C. for 30–45 min.;

d) heating from 250° C. to 500° C. in about 6.0–6.5 min. and at 500° C. for 75–180 min.;

e) heating from 500° C. to 550° C. in about 1.5–2.0 min. and at 550° C. for 30 min.;

f) heating from 550° C. to 600° C. in about 1.5–2.0 min. and at 600° C. for 60–120 min.; and g) cooling to about 70° C.

12. The method of claim 1, wherein the silicon based optical component is selected from the group consisting of an optical fiber, an optical waveguide structure, a metal coated silicon wafer, and a silicon wafer.

13. The method of claim 1, wherein said carboxylated silicone precursor composition further comprises a carrier solvent.

* * * * *